United States Patent [19]
Tanaka et al.

[11] Patent Number: 5,393,091
[45] Date of Patent: Feb. 28, 1995

[54] INFLATABLE SEATBELT SYSTEM

[75] Inventors: Yoshihiko Tanaka, Tokyo; Tsuneo Chikaraishi, Hikone, both of Japan

[73] Assignee: Takata Corporation, Tokyo, Japan

[21] Appl. No.: 107,070

[22] Filed: Aug. 17, 1993

[30] Foreign Application Priority Data

Aug. 18, 1992 [JP] Japan ................... 4-219469

[51] Int. Cl.[6] .............................................. B60R 21/18
[52] U.S. Cl. .................... 280/733; 280/801.1; 280/808
[58] Field of Search ............ 280/733, 801 R, 808

[56] References Cited
U.S. PATENT DOCUMENTS

| | | | |
|---|---|---|---|
| 3,567,247 | 3/1971 | Subkow et al. | 280/808 |
| 3,810,657 | 5/1974 | Campbell | 280/808 |
| 3,888,503 | 6/1975 | Hamilton | 280/733 |
| 4,348,037 | 9/1982 | Law et al. | 280/808 |
| 4,648,625 | 3/1987 | Lynch | 280/808 |

Primary Examiner—Kenneth R. Rice
Attorney, Agent, or Firm—Varndell Legal Group

[57] ABSTRACT

An inflatable seatbelt system wherein if extremely high acceleration acts on the vehicle laterally when a lateral collision or other similar emergency situation occurs and this acceleration exceeds a first set value, a gas generator is activated to inflate a shoulder belt (2) surely and almost instantaneously in the same way as in a case where extremely high deceleration acts on the vehicle longitudinally. In this case, a portion of the shoulder belt (2a) extending between first and second anchors (6) and (20) also inflates to a large extent. Accordingly, the head and face of the occupant (M) are brought into contact with the inflated shoulder belt portion (2a) by the lateral acceleration. Therefore, the heavy impact load, which would otherwise be applied to the occupant's head and face, is relieved. Thus, the occupant's head and face are effectively and reliably protected.

7 Claims, 9 Drawing Sheets

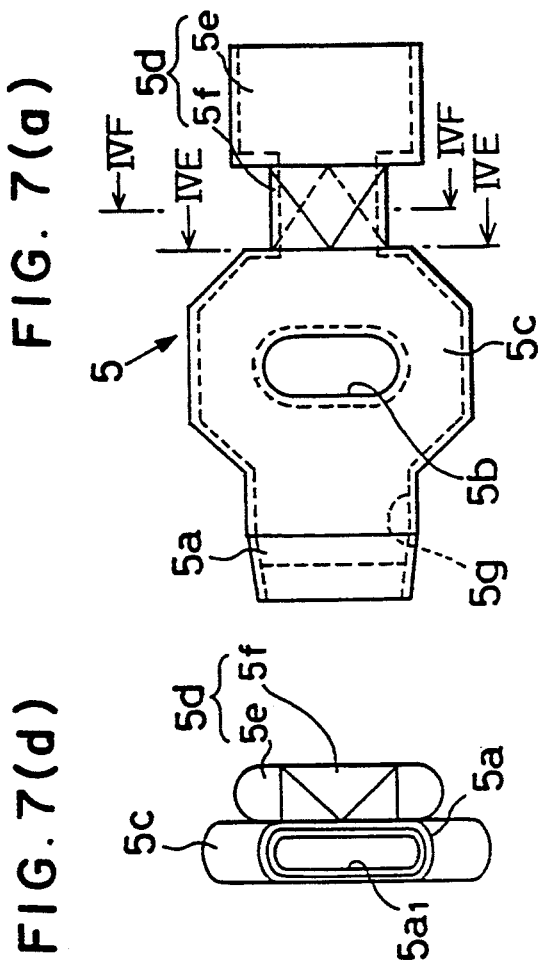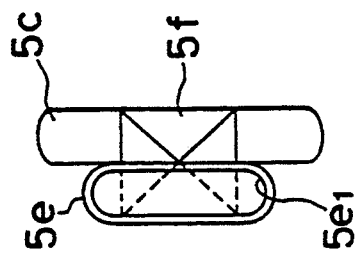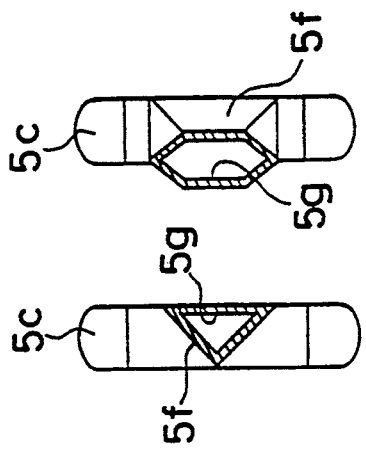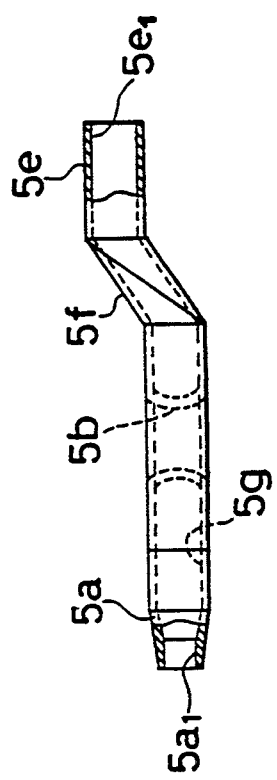

5,393,091

INFLATABLE SEATBELT SYSTEM

BACKGROUND OF THE INVENTION

The present invention relates to an inflatable seatbelt system having a webbing at least a part of which is formed in the shape of a bag and which is maintained in a strap-like configuration under normal circumstances but, when an emergency situation occurs, inflates by the action of a gas supplied from a gas generating device. More particularly, the present invention relates to an inflatable seatbelt system designed to protect the occupant from a large impact applied in the lateral direction of the vehicle when it comes into collision sideways or other similar emergency situation occurs.

Hitherto, seatbelt systems have been attached to the seats of many vehicles, for example, automobiles. A typical seatbelt system is arranged to restrain the occupant's body by a webbing upon the occurrence of an emergency situation, e.g., a collision of the vehicle, thereby protecting the occupant from injury which would otherwise be done to him or her by collision with a part of the vehicle body. In such a seatbelt system, however, the width of the webbing, which constitutes a belt for restraining the occupant's body, is not so large. Therefore, the occupant's body locally receives a relatively heavy load when restrained by the webbing.

Under these circumstances, a variety of inflatable seatbelt systems have been proposed in which the webbing is formed in the shape of a bag, and under normal circumstances, the bag-shaped webbing is maintained in a strap-like configuration so as to function as an ordinary seatbelt, whereas, when an emergency occurs, the bag-shaped webbing is inflated by a gas introduced thereinto from a gas generating device so as to function as an air belt whereby the occupant's body is received by the inflated webbing. For example, see Japanese Patent Application Laid-Open (KOKAI) Nos. 47-26830 and 49-88220. Such an inflatable seatbelt system allows the kinetic energy of the occupant's body to be received by the webbing having a wider area. Thus, the load is dispersed, and hence the occupant's body receives a relatively light load. Accordingly, the occupant is protected even more effectively.

When inflating, the webbing shortens longitudinally and, at the same time, increases in thickness. Consequently, the webbing presses the occupant's body against the seat by an amount corresponding to the increase in the thickness. That is, since the length of the webbing shortens and the thickness thereof increases due to the inflation of the webbing, it is possible to obtain a webbing pull-in effect similar to the effectiveness obtained when the webbing is actually pulled in. Accordingly, the inflatable seatbelt system makes it possible to obtain initial restraining force similar to that provided by a pretensioner.

With the initial restraining force, the inflatable seatbelt system completely restrains the occupant's body during a crashable zone, i.e., a period between the time when a vehicle comes into collision and the time when the front part of the vehicle, gradually crashing, reaches the occupant's body. Accordingly, it is possible to make good use of the crashable zone.

If it is intended to provide a rear seat with an air bag system as is provided for the occupant seated in the front seat, the air bag system must inevitably be provided on the front seat, which lies forwardly of the rear seat. However, if the air bag system is provided on the front seat, it is difficult for the air bag system to protect the rear seat occupant properly and effectively because the position in the longitudinal direction of the front seat depends on the occupant seated therein and the reclining position also differs according to circumstances. Accordingly, the above-described inflatable seatbelt system is particularly effective as a safety device for the rear seat.

However, most of the conventional inflatable seatbelt systems, including those disclosed in the above-described publications, are designed for an emergency situation where high deceleration is applied in the longitudinal direction of the vehicle, for example, when it has a head-on collision. Almost no consideration has heretofore been given to an occasion on which a large impact is applied in the lateral direction of the vehicle, for example, when it comes into collision sideways.

Therefore, the conventional inflatable seatbelt systems cannot always be said to be capable of satisfactorily and reliably protecting the occupant when a large impact is applied in the lateral direction of the vehicle.

SUMMARY OF THE INVENTION

It is an object of the present invention to provide an inflatable seatbelt system which is capable of even more reliably and satisfactorily protecting the occupant even when a large impact is applied in the lateral direction of the vehicle.

To attain the above-described object, the present invention provides an inflatable seatbelt system for a vehicle including at least: a device for generating a gas when acceleration or deceleration acting on the vehicle upon the occurrence of an emergency situation, for example, a collision of the vehicle, exceeds a first set value; a webbing having a portion brought into contact with the occupant's body, at least a part of the contact portion being formed as a bag-shaped portion, the webbing being arranged such that when no gas is generated from the gas generating device, the webbing is maintained in the shape of a strap having a predetermined width, whereas, when a gas is generated from the gas generating device, the bag-shaped portion is inflated by the gas; a retractor operating such that when the deceleration on the vehicle is not higher than a second set value, which is lower than the first set value, the retractor allows the webbing to be freely wound up and unwound, whereas, when the deceleration on the vehicle exceeds the second set value, the retractor prevents unwinding of the webbing; a tongue connected to the webbing; and a buckle device with which the tongue is disengageably engaged. The inflatable seatbelt system further includes a first guide member and a second guide member, which is disposed below the first guide member, for guiding the bag-shaped portion of the webbing so that a portion of the bag-shaped portion which lies between the first and second guide members is disposed in the vicinity of at least one side of the occupant's body.

Preferably, the portion of the bag-shaped portion that lies between the first and second guide members is disposed alongside of at least the occupant's head and face.

In the inflatable seatbelt system of the present invention, arranged as described above, if extremely high deceleration acting on the vehicle upon the occurrence of an emergency, e.g., a collision of the vehicle, exceeds the first set value, not only the webbing is prevented from being unwound by the retractor, but also the deceleration sensor provided on the vehicle detects the extremely high deceleration and activates the gas generator. Consequently, the gas generator generates a high-pressure gas, and the gas thus generated instantaneously enters the bag-shaped portion of the webbing, causing the bag-shaped portion of the webbing to inflate speedily and reliably.

Accordingly, the occupant's body is surely and effectively supported by the inflated bag-shaped portion of the webbing. Since the kinetic energy of the occupant's body is received with a relatively wide area by virtue of the inflation of the webbing, the load is dispersed, and the occupant is reliably protected from a heavy impact load. Thus, the inflatable seatbelt system of the present invention can function not only as a seatbelt for restraining the occupant's body in a similar manner to the conventional seatbelt system but also as an air belt.

Further, according to the present invention, the bag-shaped portion of the webbing that lies between the first and second guide members when the webbing is fastened to the occupant's body is disposed in the vicinity of at least one side of the occupant's body by the action of the first and second guide members. Accordingly, if extremely high acceleration acting on the vehicle sideways when a lateral collision or other similar emergency situation occurs exceeds the first set value, not only the webbing is prevented from being unwound by the retractor, but also the bag-shaped portion of the webbing is speedily and reliably inflated by the gas from the gas generator in the same way as the above. At this time, the bag-shaped portion of the webbing that lies between the first and second guide members is also inflated, and the side of the occupant's body moved laterally of the vehicle by the lateral acceleration is effectively and reliably received by the inflated bag-shaped portion. Thus, the impact load is dispersed, and the side of the occupant's body is reliably protected from a heavy impact load in the same way as the above.

If the bag-shaped portion extending between the first and second guide members is disposed alongside of at least the occupant's head and face, at least the side portions of the occupant's head and face can be protected from a heavy impact load by the inflated bag-shaped portion of the webbing.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 6(a), 6(b) and 6(c) are views showing the webbing in the embodiment, in which FIG. 6(a) is a sectional view taken along the line IVA—IVA in FIG. 3, FIG. 6(b) shows the positional relationship between the warp and the weft, and FIG. 6(c) is a view for explanation of the features of the webbing.

FIGS. 7(a) through 7(f) are views showing a buckle device employed in the embodiment, in which FIG. 7(a) is a plan view of the buckle device, FIG. 7(b) is a front view of the buckle device, FIG. 7(c) is a side view of the buckle device as seen from the right-hand side thereof, FIG. 7(d) is a side view of the buckle device as seen from the left-hand side thereof; FIG. 7(e) is a sectional view taken along the line VE—VE in FIG. 7 (a), and FIG. 7(f) is a sectional view taken along the line VF—VF in FIG. 7(a).

FIGS. 8(a), 8(b) and 8(c) are views for explanation of a method of attaching the tongue to the webbing in the embodiment, in which FIG. 8(a) is a plan view of the joint of the tongue and the webbing, FIG. 8(b) is a partially-cutaway front view of the joint, and FIG. 8(c) is a bottom plan view thereof.

FIG. 9 (a) and 9(b) are views showing a belt cap employed in the embodiment, in which

DESCRIPTION OF THE PREFERRED EMBODIMENTS

Figure 1:
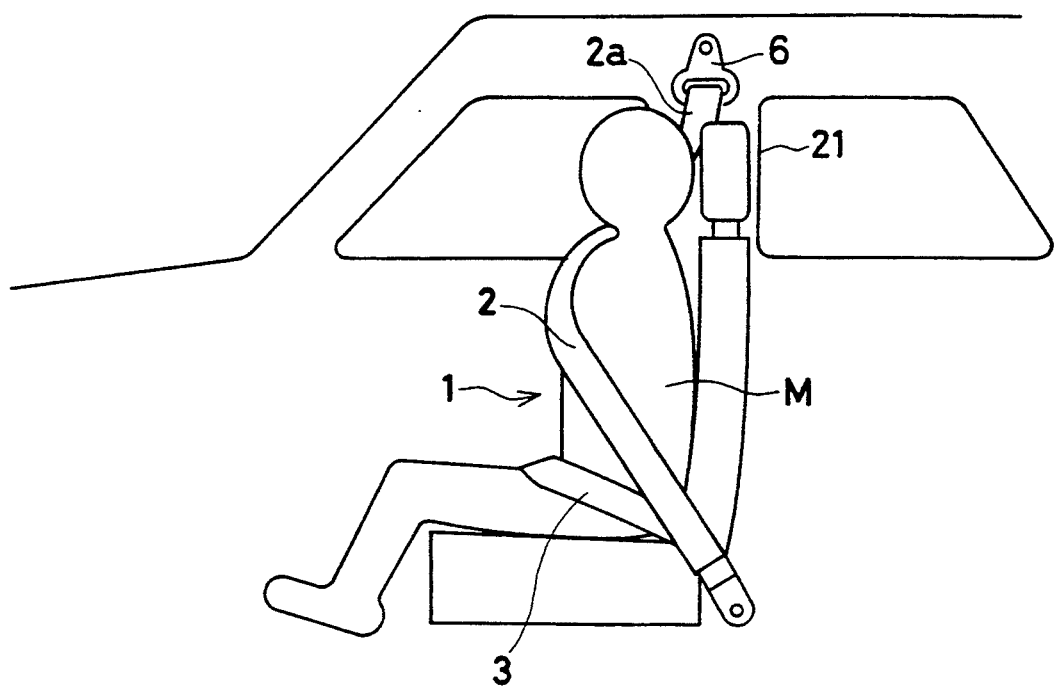
FIG. 1 is a side view showing the way in which one embodiment of the inflatable seatbelt system according to the present invention is fastened to the occupant's body.
Figure 2:
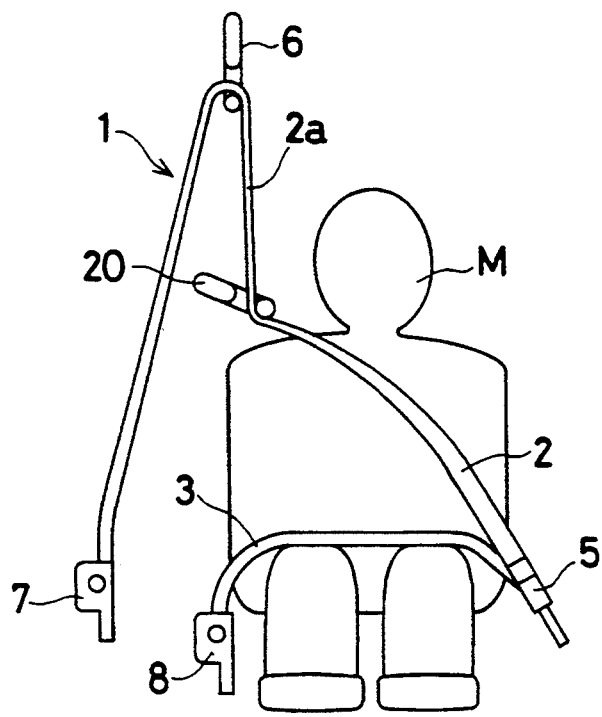
FIG. 2 is a front view of the embodiment in the fastened state.

As shown in FIGS. 1 and 2, a seat in a vehicle is provided with an inflatable seatbelt system 1 of this embodiment. The inflatable seatbelt system 1 has a shoulder belt 2 disposed to extend obliquely downward from one side to the other of the occupant's body (from the right-hand side to the left-hand side in the illustrated example), and a lap belt 3 disposed to extend from one side to the other of the occupant's body (from the right-hand side to the left-hand side in the illustrated example).

The shoulder belt 2 is guided by a first anchor 6 and a second anchor 20, which are intermediate guides, so that the shoulder belt 2 is effectively fitted to the occupant's body in a favorable condition.

Figure 3:
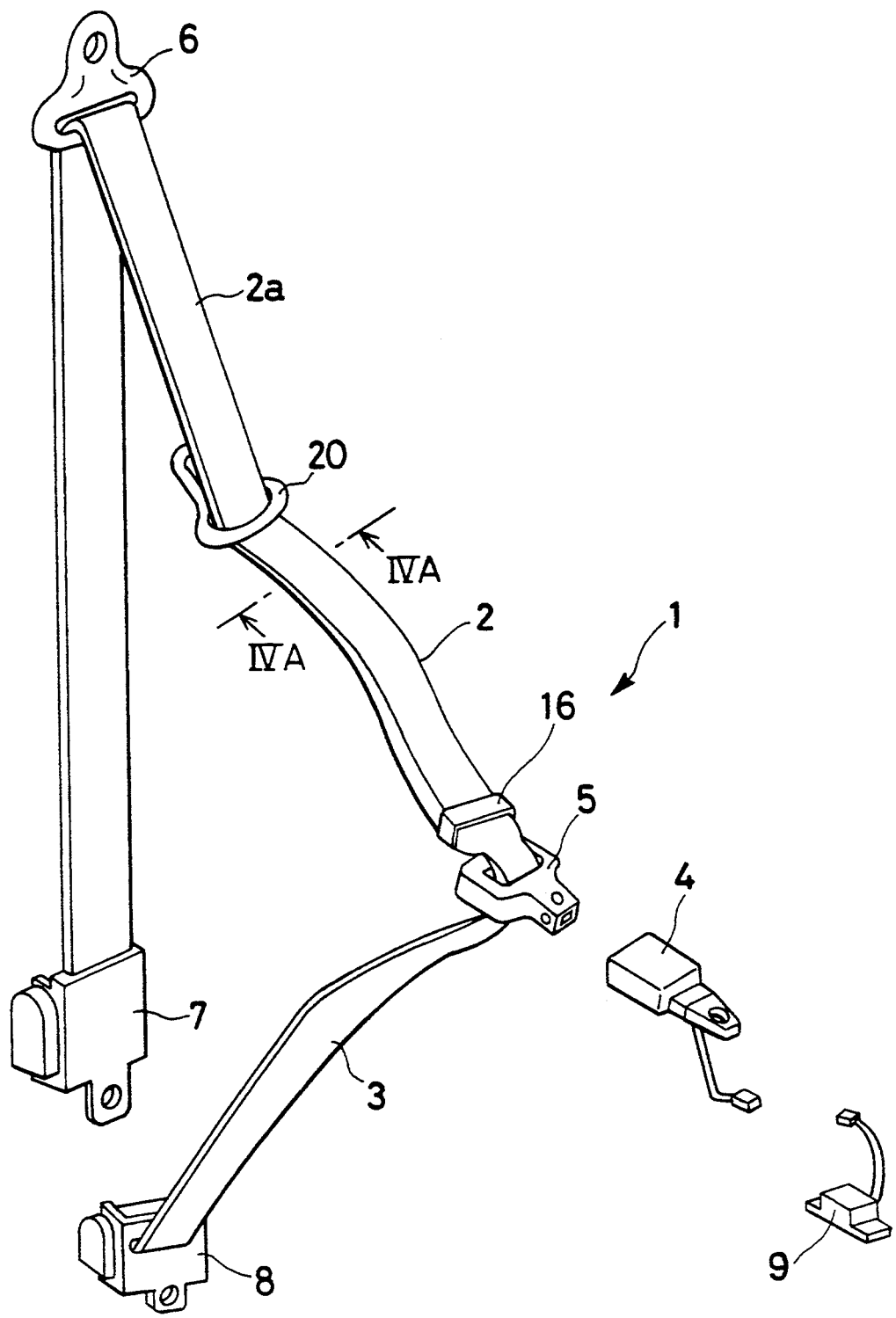
FIG. 3 schematically shows the whole arrangement of the embodiment.
Figure 4:
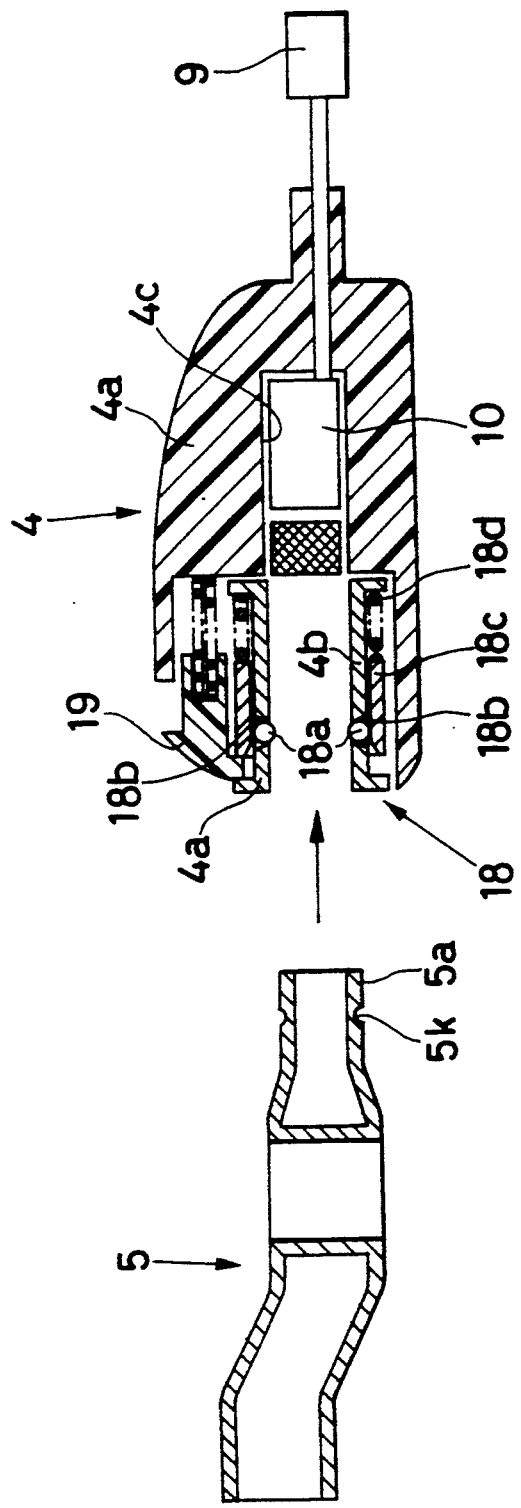
FIG. 4 is a sectional view schematically showing one example of the structure for engagement between a tongue and a buckle device, which are employed in the embodiment.
Figure 5:
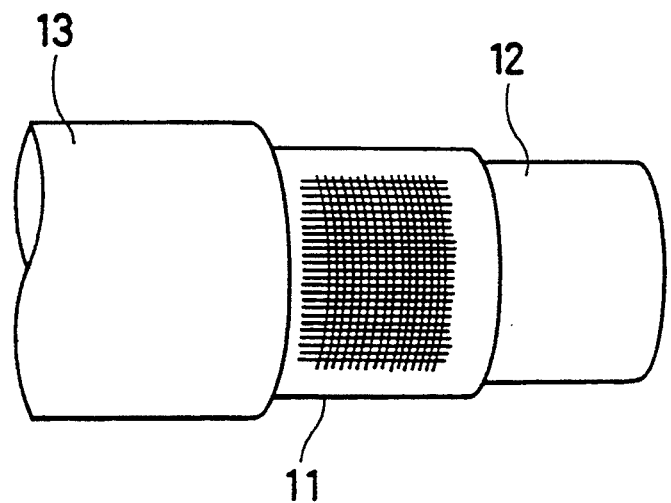
FIG. 5 is a partly-cutaway perspective view of a webbing employed in the embodiment.
Figure 6A:
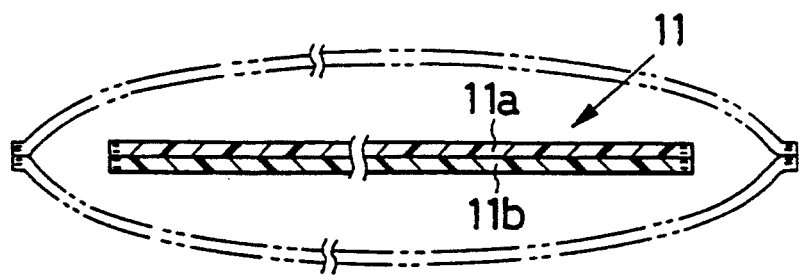
Figure 6B:
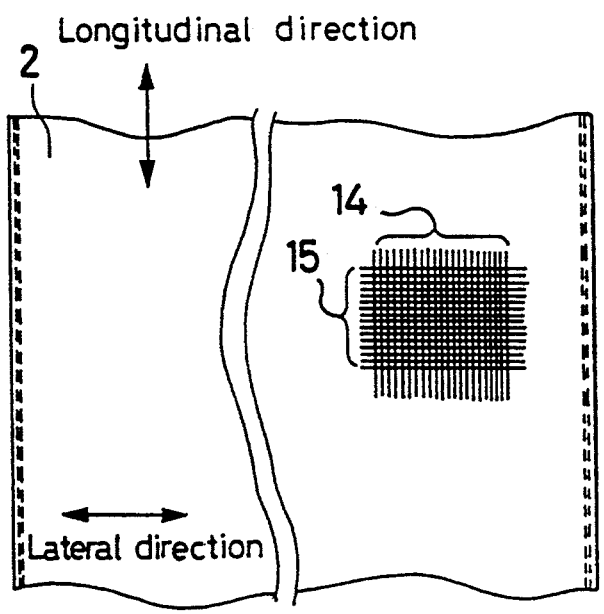
Figure 6C:
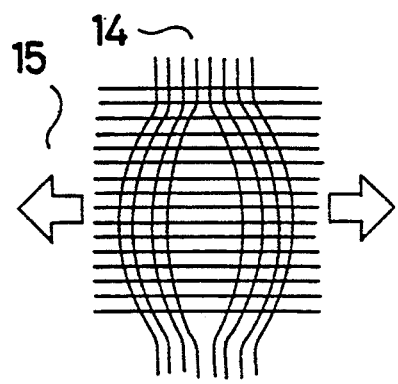

FIG. 3 schematically shows the whole arrangement of the inflatable seatbelt system; FIG. 4 is a sectional view schematically showing one example of the structure for engagement between a tongue and a buckle device, which are employed in this embodiment; FIG. 5 is a partly-cutaway perspective view of a webbing employed in the embodiment; and FIG. 6 is a view showing the webbing in the embodiment, in which FIG. 6(a) is a sectional view taken along the line VIA—VIA in FIG. 3, FIG. 6(b) shows the positional relationship between the warp and the weft, and FIG. 6(c) is a view for explanation of the features of the webbing.

As shown in FIG. 3, the inflatable seatbelt system 1 has, in addition to the above-described shoulder belt 2 and the lap belt 3, a buckle device 4 disposed, for example, on the floor of a vehicle body, and a tongue 5 inserted into the buckle device 4 so as to be engaged therewith when the occupant fastens the seatbelt. The inflatable seatbelt system 1 further has the above-described first and second anchors 6 and 20w which are disposed on a center pillar or other vehicle body member to guide the shoulder belt 2, a retractor 7 for winding up the shoulder belt 2, a retractor 8 for winding up the lap belt 3, and a deceleration sensor 9 accommodated in the buckle device 4 for sensing extremely high deceleration as acts upon the occurrence of a collision of the vehicle or other similar accident.

As shown in FIG. 4, the buckle device 4 has a body 4a, an insertion hole 4b provided in the body 4a for insertion of the tongue 5, and an accommodating hole 4c formed in the body 4a contiguously with the insertion hole 4b. The accommodating hole 4c accommodates a gas generator (G.G.) 10 which is connected to the deceleration sensor 9. The gas generator 10 is activated to generate a high-pressure gas in response to a high-deceleration detecting signal from the deceleration sensor 9.

An engaging device 18 is provided in the insertion hole 4b. The engaging device 18 is arranged such that when the tongue 5 is inserted into the insertion hole 4b, the engaging device 18 engages with the tongue 5. The engaging device 18 has ball-shaped engagement members 18a, and frusto-conical guide holes 18b formed in the body 4a such that the small-diameter side of each guide hole 18b opens to the insertion hole 4b so as to guide the associated engagement member 18a between two positions, that is, an engaging position where the engagement member 18a projects into the insertion hole 4b, and a non-engaging position where the engagement member 18a withdraws from the insertion hole 4b. The engaging device 18 further has a square cylinder-shaped lock member 18c for locking the engagement members 18a in the engaging position, and a spring 18d for biasing the lock member 18c in the direction for locking the engagement members 18a.

The buckle device 4 is further provided with a release button 19 for moving the lock member 18c in the direction for unlocking the engagement members 18a against the biasing force of the spring 18d. On the other hand, an insertion portion 5a of the tongue 5 is formed with engagement grooves 5k which are engaged with the engagement members 18a when in the engaging position.

When the tongue 5 is to be engaged with the buckle device 4 to fasten the seatbelt, the release button 19 is first moved rightwardly as viewed in FIG. 4 to move the lock member 18c to the unlock position where the engagement members 18a are movable to the respective non-engaging positions. In this state, the insertion portion 5a of the tongue 5 is inserted into the insertion hole 4b, and the engagement members 18a are fitted into the respective engagement grooves 5k.

When the release button 19 is released after the engagement members 18a have been fitted into the engagement grooves 5k, the release button 19 and the lock member 18c return to their previous positions shown in the figure. In the illustrated position, the lock member 18c locks the engagement members 18a in the state of being fitted in the engagement grooves 5k. Thus, the tongue 5 is locked to the buckle device 4. It should be noted that the structure of the tongue 5 will be detailed later.

The shoulder belt 2 and the lap belt 3 are formed as one unit. As shown in FIG. 5, these belts are formed from a tubular webbing 11, a tube 12 inserted in the webbing 11, and a cover 13 covering the webbing 11. The tube 12 is made of an elastic material which can be formed relatively thin and which has heat resistance and relatively high strength, e.g., urethane, silicone, etc. The cover 13 is made of a resin material, e.g., polyester.

As shown in FIGS. 6(a) and 6(b), the webbing 11 is formed in a tubular configuration by laying two strap-like webbing base fabrics 11a and 11b one on top of the other, which are woven fabrics each cut into a predetermined width (e.g., 50 mm), which is approximately equal to the width of a typical conventional seatbelt, and then sewing the respective side edges of the base fabrics 11a and 11b to each other at both lateral ends of the webbing 11. In this case, the warp 14 is disposed parallel to the longitudinal direction of the webbing 11, and the weft 15 is disposed in the lateral direction of the webbing 11, as shown in FIG. 6 (b).

The warp 14 is formed of threads which are not practically stretchable and have high strength, made of the same material as that of the webbing of the conventional seatbelt. In other words, the warp 14 is formed by using threads having such load-elongation characteristics that the warp 14 will not practically stretch even if tension is applied thereto when the webbing 11 is inflated by the action of the gas generator 10, as described later.

On the other hand, the weft 15 is formed of rubber-like stretchable threads made of an elastic material, e.g., urethane. Accordingly, when a predetermined level of tension is laterally applied to the webbing 11, the webbing base fabrics 11a and 11b stretch laterally to a relatively large extent, as shown in FIG. 6(c), whereas, when tension is longitudinally applied thereto, the webbing base fabrics 11a and 11b do not practically stretch longitudinally. It should be noted that in FIG. 6(c), the weft 15 is shown to be stretching by the illustration of the enlarged gap between the warp threads 14. It should also be noted that in FIG. 6(c) the warp 14 looks as if it were curvedly stretching because of the exaggerated illustration, but actually, the warp 14 does not practically stretch.

In the webbing 11 formed as described above, the weft 15 is normally in the most contracted state, as shown by the solid line in FIGS. 6(a) and 6(b). In this normal condition, the width of the webbing 11 is approximately the same as that of the webbing of the conventional seatbelt. In the normal condition, the webbing 11 is in the flattest state and hence the thickness thereof is the smallest.

In actual use, at least a part of the tubular webbing 11 is formed in the shape of a bag. When a gas is supplied into the bag-shaped portion of the webbing 11, the bag-shaped portion is caused to inflate by the gas pressure. At this time, tension is applied to both the warp 14 and the weft 15 by the expansion force of the bag-shaped portion of the webbing 11. As has been described above, the warp 14 does not practically stretch even if such tension is applied thereto, but the weft 15 is stretched by the tension. Consequently, the webbing 11 inflates to a large extent in the lateral direction but does not practically expand longitudinally, as shown by the two-dot chain line in FIG. 6(a).

As shown in FIGS. 7(a) through 7(f), the tongue 5 includes an insertion portion 5a, which has a gas inlet port $5a_1$ and is inserted into and engaged with the buckle device 4, and an operating portion 5c that has a webbing receiving hole 5b for guiding the webbing 11 extending therethrough and that is used to engage and disengage the tongue 5 in relation to the buckle device 4. The tongue 5 further includes a connecting portion 5d to which the shoulder belt 2 is connected, and an engagement portion (not shown) which is engaged with the engaging device of the buckle device 4 when the buckle 5 is inserted into the buckle device 4. The connecting portion 5d includes a gas outlet portion 5e that is formed with a gas outlet port $5e_1$ and that has a width larger than the inner width of the tubular shoulder belt 2, and a neck portion 5f that connects the gas outlet portion 5e to the operating portion 5c and that has a width smaller than that of the gas outlet portion 5e. Accordingly, a step 5i is defined between the gas outlet portion 5e and the neck portion 5f.

The insertion portion 5a, the operating portion 5c, the neck portion 5f and the gas outlet portion 5e are formed with a continuous gas flow hole 5g extending through these portions to provide communication between the gas inlet port $5a_1$ and the gas outlet port $5e_1$. In this case, the gas flow hole 5g is formed to bypass the webbing receiving hole 5b of the operating portion 5c so as not to interfere with it.

In addition, the insertion portion 5a, the operating portion 5c and the gas outlet portion 5e are each formed to have a rectangular or elliptical cross-sectional configuration. Further, the end of the neck portion 5f which is connected to the operating portion 5c is formed to have a triangular cross-sectional configuration, as shown in FIG. 7(e), and the axially central portion of the neck portion 5f has a hexagonal cross-sectional configuration. That is, the neck portion 5f is formed in such a configuration that the two axial ends thereof have triangular cross-sectional configurations which are inverse to each other, and the intermediate portion of the neck portion 5f has a hexagonal cross-sectional configuration.

Further, the insertion portion 5a and the operating portion 5c are disposed on a plane different from the plane where the gas outlet portion 5e is disposed, as shown in FIG. 7(b). That is, as shown in FIG. 8(b), the surface of the gas outlet portion 5e lies closer to the side (the upper side as viewed in the figure) from which the webbing 11 is inserted into the webbing receiving hole 5b than the surface of the insertion portion 5a and the operating portion 5c.

Figure 8A:
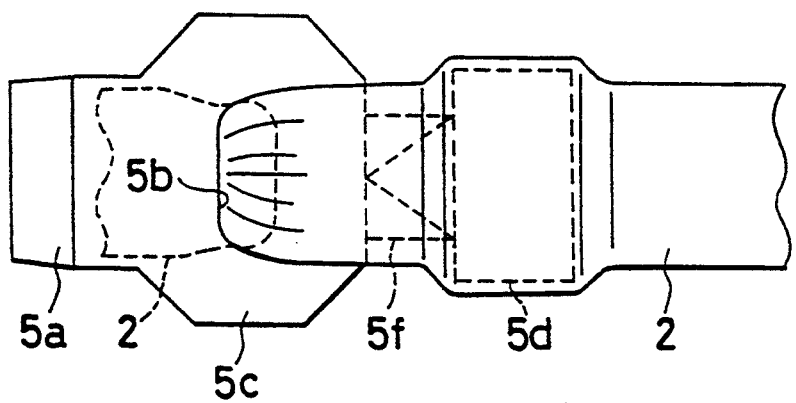

The following is a description of a method of attaching the tongue 5, arranged as described above, to the webbing 11 constituting the shoulder belt 2 and the lap belt 3. As shown in FIG. 8(c), the weft 15 on the reverse side of the portion of the webbing 11 which corresponds to the boundary between the shoulder belt 2 and the lap belt 3 is cut over a predetermined area at the center in the direction of the width of the webbing 11. Next, the weft cut area of the webbing 11 is widened in the lateral direction to form an opening 11c having a predetermined width. The gas outlet portion 5e of the tongue 5 is inserted into the webbing 11 toward the shoulder belt portion thereof from the opening 11c.

Figures 9A, 9B:
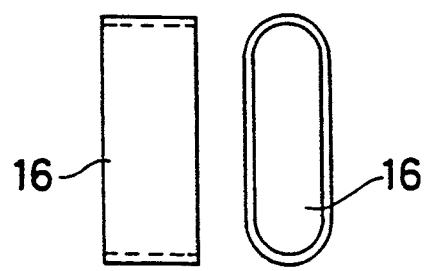
FIG. 9(a) is a front view of the belt cap.
FIG. 9(b) is a side view of the belt cap.
Figure 8B:
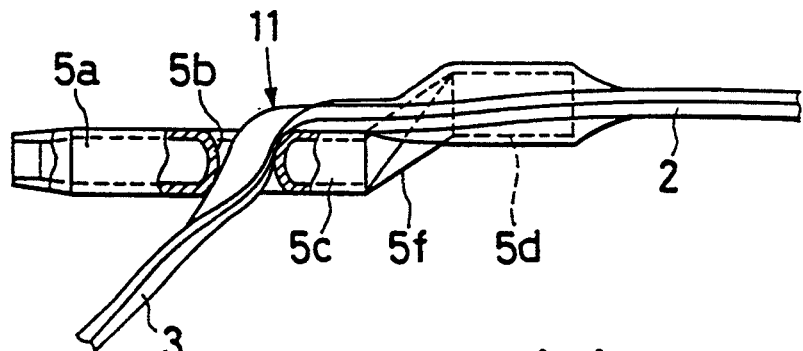
Figure 8C:
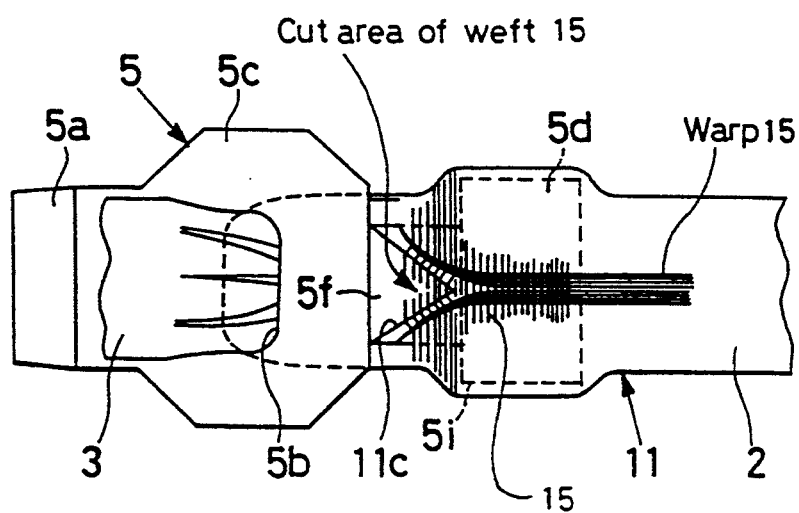

Then, as clearly shown in FIG. 8(b), the lap belt portion of the webbing 11, which extends in the opposite direction to the direction of insertion of the gas outlet portion 5e, is passed through the hole 5b provided in the operating portion 5c by slightly contracting the webbing 11 in the lateral direction. Since the surface of the connecting portion 5d lies above the surface of the operating portion 5c as viewed in FIG. 8(b), the webbing 11 smoothly extends through the hole 5b with minimal rising of the portion 11d thereof which lies immediately behind the hole 5b. Finally, as shown in FIGS. 9(a) and 9(b), an annular belt cap 16 made of an elastic metal material is fitted onto the gas outlet portion 5e of the tongue 5 with the webbing 11 interposed therebetween, thereby securing the tongue 5 to the webbing 11.

With the tongue 5 attached to the webbing 11 in this way, the portion of the shoulder belt 2 which lies at the gas outlet portion 5e is widened with the weft 15 thereof being stretched by the gas outlet portion 5e. Therefore, this portion of the shoulder belt 2 is brought into close contact with the gas outlet portion 5e by the resilience of the weft 15. Further, the width of the webbing 11 is reduced at the neck portion 5f by virtue of the resilience of the weft 15 of the webbing 11, as shown in FIGS. 8(a) and 8(c). Accordingly, the step 5i between the gas outlet portion 5e and the neck portion 5f is surely engaged with the inner wall of the webbing 11. Thus, the gas outlet portion 5e of the tongue 5 is restrained from slipping out of the shoulder belt 2. Further, since the portion 11e of the webbing 11 which extends through the hole 5b of the tongue 5 is in close contact with the inner wall 5h of the hole 5, the tongue 5 is effectively prevented from moving relative to the webbing 11 in the direction in which it slips out of the webbing 11. Accordingly, even if large tension is longitudinally applied to the shoulder belt 2, the tongue 5 is surely prevented from slipping out of the shoulder belt 2.

Further, the portion of the shoulder belt 2 which is pierced with the connecting portion 5d of the tongue 5 is clamped so as to come in close contact with the connecting portion 5d not only by the elastic force of the weft 15 of the webbing 11 but also by the elastic force of the belt cap 16. Therefore, the airtightness of the area of contact between the shoulder belt 2 and the connecting portion 5d of the tongue 5 is satisfactorily ensured.

Further, in the state where the tongue 5 is connected to the webbing 11, the neck portion 5f of the tongue 5 lies in the weft cut area of the webbing 11. Since the neck portion 5f has a cross-section varying from a triangular configuration to a hexagonal configuration, it is possible to minimize the number of weft threads 15 to be cut to form the opening 11c in the webbing 11.

Figure 10:
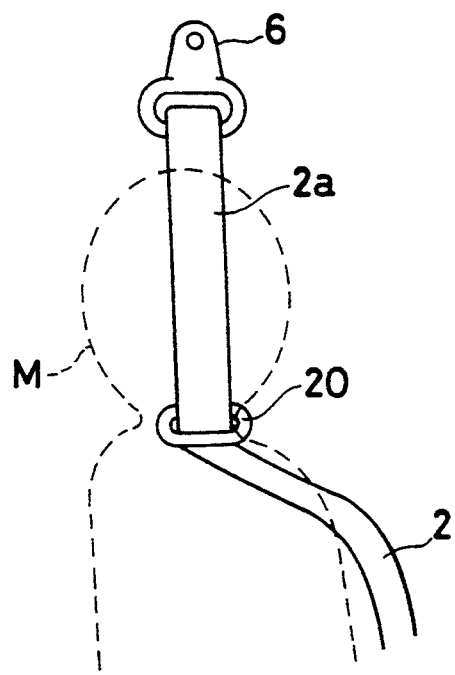
FIG. 10 is a side view for explanation of the positional relationship between the occupant's body and a portion of a shoulder belt which extends between first and second anchors.
Figure 12:
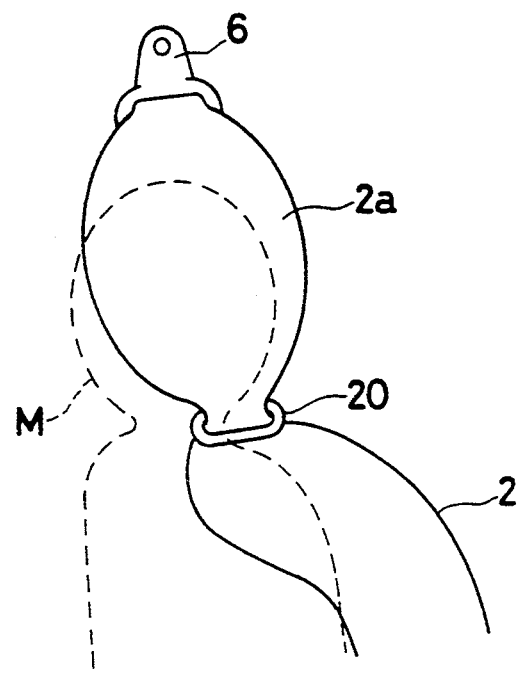
FIG. 12 is a side view showing the shoulder belt portion extending between the first and second anchors when it is inflated for the occupant's body.

Incidentally, in this embodiment the shoulder belt 2 is guided by the first anchor 6 and the second anchor 20, as described above. As shown in FIG. 1, the first anchor 6 is rigidly secured to the upper part of a center pillar 21, for example, of the vehicle body in the same way as in the case of a typical conventional anchor. As shown in FIGS. 2 and 10, the second anchor 20 is similarly secured to the lower part of the center pillar 21, for example, of the vehicle body below the first anchor 6 at a predetermined spacing. As will be clear from FIG. 10, the second anchor 20 is disposed so that a portion 2a of the shoulder belt 2 which lies between the first and second anchors 6 and 20 extends alongside of the head and face of the occupant M.

In the inflatable seatbelt system 1 of this embodiment, arranged as described above, the shoulder belt 2 of the bag-shaped webbing 11 is uninflated and maintained in a thin strap-like configuration under normal circumstances, as shown by the solid line in FIG. 6(a). When the seatbelt is not fastened to the occupant's body, the buckle device 4 and the tongue 5 are not in engagement with each other, and the shoulder belt 2 has been wound up by the retractor 7, while the lap belt 3 has been wound up by the retractor 8.

The occupant seated in the seat unwinds the shoulder and lap belts 2 and 3 from the respective retractors 7 and 8 and inserts the tongue 5 into the buckle device 4, thereby fastening the seatbelt. In this seatbelt set condition, the tongue 5 is locked to the buckle device 4 by the engaging device 18, and hence the tongue 5 and the buckle device 4 are maintained in the connected condition without likelihood of the tongue 5 undesirably disengaging from the buckle device 4. Further, when the tongue 5 and the buckle device 4 are in the connected state, the accommodating hole 4c in the buckle device 4 and the gas flow hole 5g in the tongue 5 align with each other to form a single gas flow passage.

Further, in the seatbelt set condition, the shoulder and lap belts 2 and 3 are fitted to the occupant's body by being biased with relatively weak force in the winding-up direction by the respective retractors 7 and 8. This biasing force has previously been set to such a level that the seatbelt will not give a sensation of pressure to the occupant. In addition, under normal circumstances, the take-up reels of the seatbelt retractors 7 and 8 are not locked. Therefore, the two belts 2 and 3 can be unwound freely. Thus, the shoulder belt 2 and the lap belt 3 are smoothly unwound and rewound in response to the normal movement of the occupant's body, thereby allowing an improvement in the comfortability of the seatbelt.

Further, in the seatbelt set condition, the shoulder belt 2 is correctly guided in relation to the body of the occupant M by the first and second anchors 6 and 20. Therefore, the shoulder belt 2 is effectively fitted to the occupant's body in a favorable condition. In addition, the shoulder belt portion 2a extending between the first and second anchors 6 and 20 is disposed alongside of the occupant's head and face.

If the deceleration acting on the vehicle longitudinally exceeds a second set value during the running of the vehicle, the occupant's body is urged to move forwardly by inertia, pressing both the belts 2 and 3 to be unwound from the respective seatbelt retractors 7 and 8. However, at this time, the deceleration sensors associated with the retractors 7 and 8 operate to lock the take-up reels, thereby preventing the belts 2 and 3 from being unwound. Particularly, in the seatbelt retractor 7, the shoulder belt 2 is clamped by the associated clamp. Therefore, the shoulder belt 2 is even more surely prevented from being unwound. Moreover, even if tension is applied to the two belts 2 and 3 in the longitudinal direction of the seatbelt by the inertial movement of the occupant's body, the belts 2 and 3 will not practically stretch because the warp 14, disposed longitudinally, will not practically stretch.

Further, at this time, tension is applied to the tongue 5 from the buckle device side so as to urge the tongue 5 to slip out of the shoulder belt 2. However, there is no likelihood of the tongue 5 slipping out of the shoulder belt 2, as described above.

Accordingly, the occupant's body is effectively and reliably restrained by the shoulder and lap belts 2 and 3, thereby being prevented from moving forwardly. At this time, the shoulder belt 2 is guided by the intermediate guide 6 so as to come in contact with the correct position on the occupant's body. Thus, the inflatable seatbelt system 1 of this embodiment functions as a seatbelt for restraining the occupant's body in a similar manner to the conventional seatbelt system. It should be noted that although the weft 15 in a predetermined region is cut when the tongue 5 is to be attached to the webbing 11, the warp 14 is not cut at all. Therefore, sufficiently high strength is ensured for the two belts 2 and 3 to endure tension in the longitudinal direction.

If extremely high deceleration acting on the vehicle longitudinally upon the occurrence of an emergency, e.g., a collision of the vehicle, exceeds a first set value, not only both the belts 2 and 3 are prevented from being unwound by the seatbelt retractors 7 and 8, but also the deceleration sensor 9 provided on the vehicle detects the extremely high deceleration and activates the gas generator 10. Consequently, the gas generator 10 generates a high-pressure gas, and the gas thus generated instantaneously enters the bag-shaped shoulder belt 2 through the accommodating hole 4c of the buckle device 4 and the gas flow hole 5g of the tongue 5. As a result, the weft 15 is stretched by the pressure of the gas entering the shoulder belt 2. Therefore, the shoulder belt 2 surely and almost instantaneously inflates into a configuration such as that shown by the two-dot chain line in FIG. 6(a).

Accordingly, the upper half of the occupant's body, i.e., the shoulder, the chest, etc., is surely and effectively supported by the inflated shoulder belt 2. Since the kinetic energy of the occupant's body is received with a relatively wide area by virtue of the inflation of the shoulder belt 2, the load is dispersed, and the occupant is reliably protected from a heavy impact load. That is, the inflatable seatbelt system 1 functions as an air belt.

When the shoulder belt 2 inflates, the weft 15 stretches, but the warp 14 slightly contracts. Therefore, the shoulder belt 2 slightly contracts in the longitudinal direction. As a result, the inflatable seatbelt system 1 can function as a pretensioner by virtue of the inflation of the shoulder belt 2, thereby enabling the slack in the seatbelt to be taken up even more quickly. Thus, the inflatable seatbelt system 1 surely and effectively exhibits the seatbelt function, resulting in an improvement in the occupant restraining performance of the seatbelt. In this case also, there is no likelihood of the tongue 5 slipping out of the shoulder belt 2.

Figure 11:
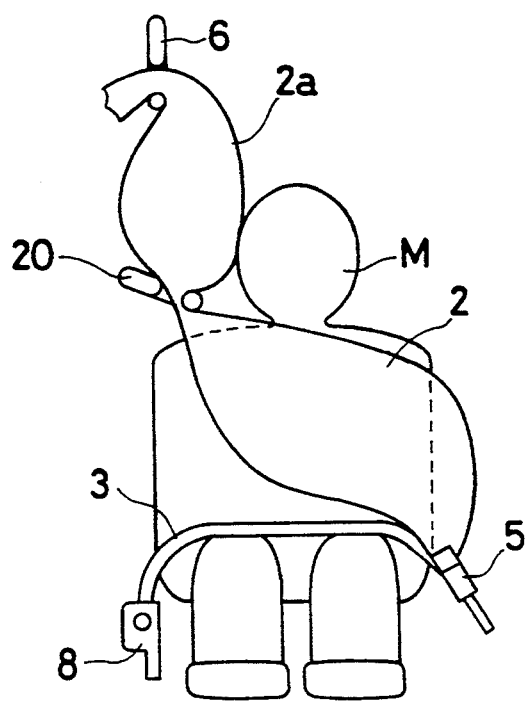
FIG. 11 is a front view showing the shoulder belt when inflated for the occupant's body.

If extremely high acceleration acts on the vehicle laterally when a lateral collision or other similar emergency situation occurs and this acceleration exceeds the first set value, the gas generator 10 is activated to inflate the shoulder belt 2 surely and almost instantaneously in the same way as in the case of the above-described longitudinal deceleration. In this case, the shoulder belt portion 2a extending between the first and second anchors 6 and 20 also inflates to a large extent. Accordingly, the head and face of the occupant M are brought into contact with the inflated shoulder belt portion 2a by the lateral deceleration, as shown in FIG. 11. Therefore, the heavy impact load, which would otherwise be applied to the occupant's head and face, is relieved. Thus, the occupant's head and face are effectively and reliably protected.

To release the tongue 5 from the buckle device 4, the lock made by the engaging device 18 is canceled by actuating the release button 19. Consequently, the tongue 5 disengages from the buckle device 4. In addition, the shoulder and lap belts 2 and 3 are wound up by the respective seatbelt retractors 7 and 8.

With the inflatable seatbelt system 1 of this embodiment, arranged as described above, it is also possible to relieve an impact applied laterally of the vehicle when high deceleration acts thereon laterally upon the occurrence of a lateral collision or other similar emergency situation and to thereby protect the occupant M effectively and reliably.

As will be clear from the foregoing description, the inflatable seatbelt system of the present invention can function not only as a seatbelt for restraining the occupant's body in a similar manner to the conventional seatbelt system but also as an air belt for surely protecting the occupant from a heavy impact load by receiving the kinetic energy of the occupant's body with a relatively wide area. In particular, the present invention is also capable of relieving an impact applied laterally of the vehicle when high deceleration acts thereon laterally upon the occurrence of a lateral collision or other similar emergency situation to thereby protect the occupant effectively and reliably.

What we claim is:

1. An inflatable seatbelt system for a vehicle including at least: means for generating a gas when acceleration or deceleration acting on the vehicle exceeds a first set value indicating occurrence of an emergency situation; a webbing having a portion brought into contact with an occupant's body, at least a part of said contact portion being formed as a bag-shaped portion; said webbing being arranged such that when no gas is generated from said gas generating means, said webbing is maintained in the shape of a strap having a predetermined width, and, when a gas is generated from said gas generating means, said bag-shaped portion is inflated by the gas; a retractor operating such that when the deceleration on the vehicle is not higher than a second set value, which is lower than said first set value, said retractor allows said webbing to be freely wound up and unwound, and, when the deceleration on the vehicle exceeds said second set value, said retractor prevents unwinding of said webbing; a tongue connected to said webbing; and a buckle device with which said tongue is disengageably engaged; and said seatbelt system further including a first guide member and a second guide member, which is disposed below said first guide member, for guiding said bag-shaped portion of said webbing so that a portion of said bag-shaped portion which lies between said first and second guide members is disposed in the vicinity of at least one side of said occupant's body.

2. An inflatable seatbelt system according to claim 1, wherein said portion of said bag-shaped portion that lies between said first and second guide members is disposed alongside of at least said occupant's head and face.

3. An inflatable seatbelt system for a vehicle comprising at least: means for generating a gas when acceleration or deceleration acting on the vehicle exceeds a first set value indicating occurrence of an emergency situation; a webbing having a portion brought into contact with an occupant's body, at least a part of said contact portion being formed as a bag-shaped portion; said webbing being arranged such that when no gas is generated from said gas generating means, said webbing is maintained in the shape of a strap having a predetermined width, and when a gas is generated from said gas generating means, said bag-shaped portion is inflated by the gas; a retractor operating such that when the deceleration on the vehicle is not higher than a second set value, which is lower than said first set value, said retractor allows said webbing to be freely wound up and unwound, and when the deceleration on the vehicle exceeds said second set value, said retractor prevents unwinding of said webbing; a tongue connected to said webbing; and a buckle device with which said tongue is disengageably engaged;

said seatbelt system further comprising first guide means and a second guide means, said second means disposed below said first guide means, for dividing said bag-shaped portion of said webbing into two parts, and one part of said bag-shaped portion is arranged between said first and second guide means and in a vicinity of one side of said occupant's body.

4. The inflatable seatbelt system of claim 3, wherein said first and second guide means are separately secured to said vehicle, and said first guide means is secured above a head of said occupant's body.

5. The inflatable seatbelt system of claim 3, wherein said one part of said bag-shaped portion is arranged along a side of a head of said occupant's body.

6. The inflatable seatbelt system of claim 5, wherein when said one part of said bag-shaped portion is inflated, said webbing adjacent said one part of said bag-shaped portion contacts a head of said occupant's body.

7. The inflatable seatbelt system of claim 3, wherein said another part of said bag-shaped portion is arranged between said second guide means and said tongue so that when said bag-shaped portion is inflated, said webbing can fully and completely inflate between said second guide means and said tongue.

* * * * *